United States Patent

[11] 3,588,132

| [72] | Inventor | Ronald Edmondson<br>Chislehurst, England |
|---|---|---|
| [21] | Appl. No. | 771,226 |
| [22] | Filed | Oct. 28, 1968 |
| [45] | Patented | June 28, 1971 |
| [73] | Assignee | Plastiers Limited of Watham Way<br>Woolwich Industrial Estate, London,<br>England |
| [32] | Priority | Oct. 30, 1967, Mar. 20, 1968 |
| [33] | | Great Britain |
| [31] | | 49214/67 and 13548/68 |

[54] SEAL RING FITTINGS FOR PIPES
8 Claims, 4 Drawing Figs.

| [52] | U.S. Cl. | 277/207 |
|---|---|---|
| [51] | Int. Cl. | F16j 15/10 |
| [50] | Field of Search | 277/207,<br>206, 208, 209, 211, 124 |

[56] References Cited
UNITED STATES PATENTS

| 2,452,276 | 10/1948 | Woodling | 277/207A |
|---|---|---|---|
| 3,046,028 | 7/1962 | Nathan | 277/207A |

FOREIGN PATENTS

| 282,160 | 12/1927 | Great Britain | 277/207A |
|---|---|---|---|

Primary Examiner—Laverne D. Geiger
Assistant Examiner—Robert I. Smith
Attorney—Mason, Kolehmainen, Rathburn & Wyss ABSTRACT: This invention relates to seal ring fittings for pipes for providing a fluidtight seal between two pipes which are to be joined together. Preferably the fitting is made of a synthetic plastics material and comprises a body portion including a terminal socket section in which is formed an annular open ended recess. A resilient sealing ring is retained in this recess by means of a locking ring having a surface which closes the end of the recess and the ring is provided with means which cooperate with the socket section to maintain the ring in engagement therewith.

PATENTED JUN28 1971

INVENTOR:
ROLAND EDMONDSON
by:
Mason, Kolehmainen, Rathburn & Wyss,
Attys

SEAL RING FITTINGS FOR PIPES

SUMMARY OF THE INVENTION

This invention relates to pipes and pipe fittings. It is especially applicable to pipes and fittings such as are used for the supply or discharge of water or other liquids, but it is also applicable to pipes and fittings for other purposes, where it is necessary to provide connections between a number of lengths of pipe or between pipes and fittings of various kinds.

A usual method of constructing a pipe line consists in forming each of a number of lengths of pipe with a socket at one of its ends, which is adapted to receive the other or spigot end of the next section of pipe. A seal ring is fitted in each socket so as to form a seal with the spigot of the next pipe section (or of a fitting to which the end of the pipe is connected), whilst still allowing for longitudinal movement between the pipes sections or between the pipe and fitting due to thermal expansion or construction of the pipe.

When assembling such pipes on a building, for example, each section may be held by a clip which engages round its socket and which is secured to the building.

This method can be applied to pipes and fittings made of synthetic plastics materials. It has been found, however, that if it is used with a pipe which is formed of a number of sections joined together, there is a risk that one or more of the clips may be tightened to such an extent as to prevent the sliding movement which is needed to accommodate thermal expansion or contraction from taking place at these joints. This could result in the expansion or contraction of several sections of the pipe all being taken at one joint, with possible damage to the latter, or even a complete separation of the joint. The present invention sets out to overcome or reduce the risk of this.

According to the invention, a pipe or pipe fitting for receiving the spigot end of a pipe in sliding engagement comprises a body portion having an annular open ended recess in a terminal socket section, and a resilient sealing ring retained in the recess by a locking ring which has a surface closing the end of the recess the ring having a part which cooperates with the socket section to maintain the ring and pipe or fitting in engagement.

Several embodiments of the invention will now be described, by way of example, with reference to the accompanying drawings, in which.

Figure 1:
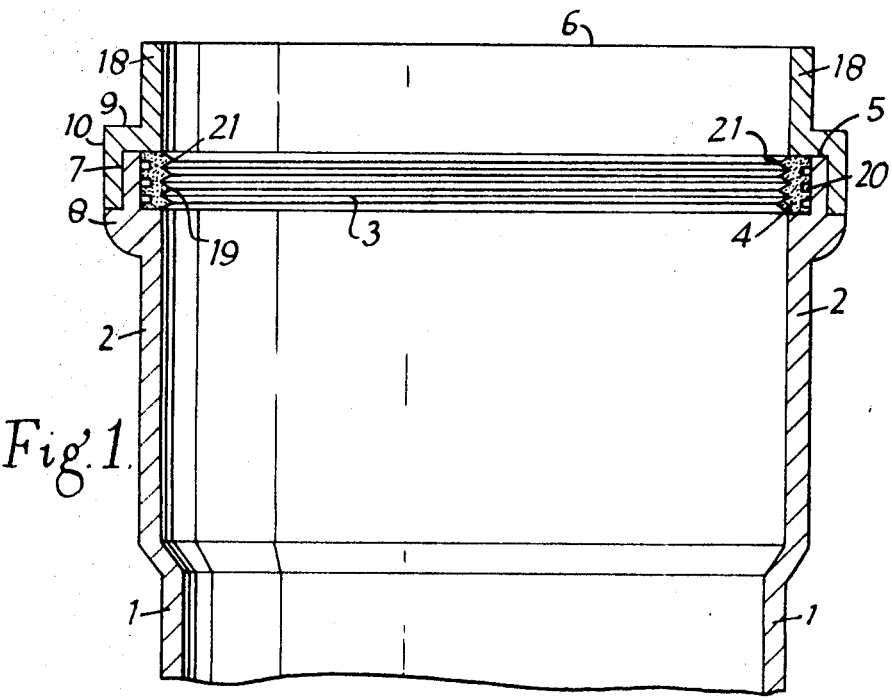
FIG. 1 shows in cross section a fitting including a locking ring.

In the drawings a pipe or fitting 1 is shown, which is moulded from a suitable plastics composition which is intended to receive the spigot end of another section of pipe or of a fitting to which the pipe or fitting 1 is connected. Preferred materials are acetobutylstyrene (ABS), polyvinyl chloride (P.V.C.) and polyvinyldichloride (P.V.D.C.). The pipe or fitting is formed with a terminal tubular socket section 2 which is of larger diameter than the body to allow for the thickness of the spigot end of a similar pipe.

The end of the tubular socket section 2 is increased in diameter both internally and externally by an amount which is sufficient to form an internal annular recess 3 into which is fitted a resilient ring 4 which engages with and forms a water tight seal with a pipe when inserted in the socket. The sealing ring may be made of any suitable elastomeric material such as synthetic rubber (e.g. Neoprene), and in the drawings is shown as having a number of circumferential ribs 19 around its internal surface and corresponding grooves 20 around its external surface. The purpose of these internal ribs is that when a length of pipe is inserted in the pipe or fitting a first rib 21 acts as a wiper blade and prevents any grit or other foreign bodies getting into the joint and impairing the efficiency of the seal provided by the remaining ribs. Also, this type of seal exerts a much reduced hoop stress to a plastic pipe compared to the known type of O-ring seals which are used virtually as a bung. The increase in external diameter provides a shoulder 5 against which a locking ring 6 can engage. The part of the pipe or fitting which surrounds the sealing ring 4, whilst being of greater diameter than the remainder of the tubular socket section of the pipe or fitting has its outer diameter reduced near the end of the pipe or fitting to form an annular recess 7 and abutment means in the form of an annular shoulder 8, in and against which the locking ring 6 engages when the fitting is assembled.

The locking ring 6, is formed with an axial skirt 18 around its internal periphery which contacts with the outer surface of a pipe when inserted in a pipe or fitting and includes a flange part 9 which may have a similar internal diameter and thickness to the body part. The locking ring can thus be slid onto the end of the pipe or fitting but it has a second axial skirt 10 which is of greater diameter and which is designed to fit over the end of the socket section and seat against the shoulder 8, of the latter. This shoulder 8, may be omitted if required, or alternatively can be broken up to form a number of shoulders spaced round the fitting. When the pipe or fitting is assembled, it is generally cylindrical internally except for the internal recess 3 which is formed between the two parts and into which the sealing ring 4 is held.

The pipe or fitting and the locking ring may be made of any suitable material which can be secured together by solvent or fusion welding or by an adhesive or other means. Ultrasonic means may be used to produce fusion welding. Examples of suitable synthetic plastics are acetobutylstyrene (ABS), polyvinylchloride (P.V.C.) and polyvinlydichloride (P.V.D.C.).

Whilst the use of solvent or fusion welding, using suitable methods and materials, offer particular advantages, it would also be possible to use other methods and materials, including those involving the use of adhesives. The use of solvent welding, however, provides advantages in time and ease of working. Fusion welding is also of especial value when means are available for producing the desired localized heat.

To assemble the pipe or fitting which has been described, the locking ring is first fitted on the end of a pipe to which the pipe or fitting 1 is to be secured and the sealing ring is inserted in the recess in the end of the socket part of the pipe or fitting. The latter is then pressed over the end of the pipe, the necessary solvent is applied around its end where the locking ring will fit and this ring is then pressed over and against the end of the socket part, where it is held by the fusion welding which results.

Although the body part of the fitting has been described as having a simple stepped end, other shapes would be possible with or without a degree of taper where the locking ring is fitted. Variations in the shape of the locking ring are also possible.

The sealing ring used may have any of a number of different sections: in particular it may have internal and/or external ribs and/or grooves. It is preferred, however, to use a seal ring having a number of internally projecting ribs or lips, which will form effective seals with the pipe in spite of movements between the pipe and the fitting, and also to form the sealing ring with external grooves behind the ribs, which facilitate the elastomeric displacement of the material of the ring.

Figure 3:
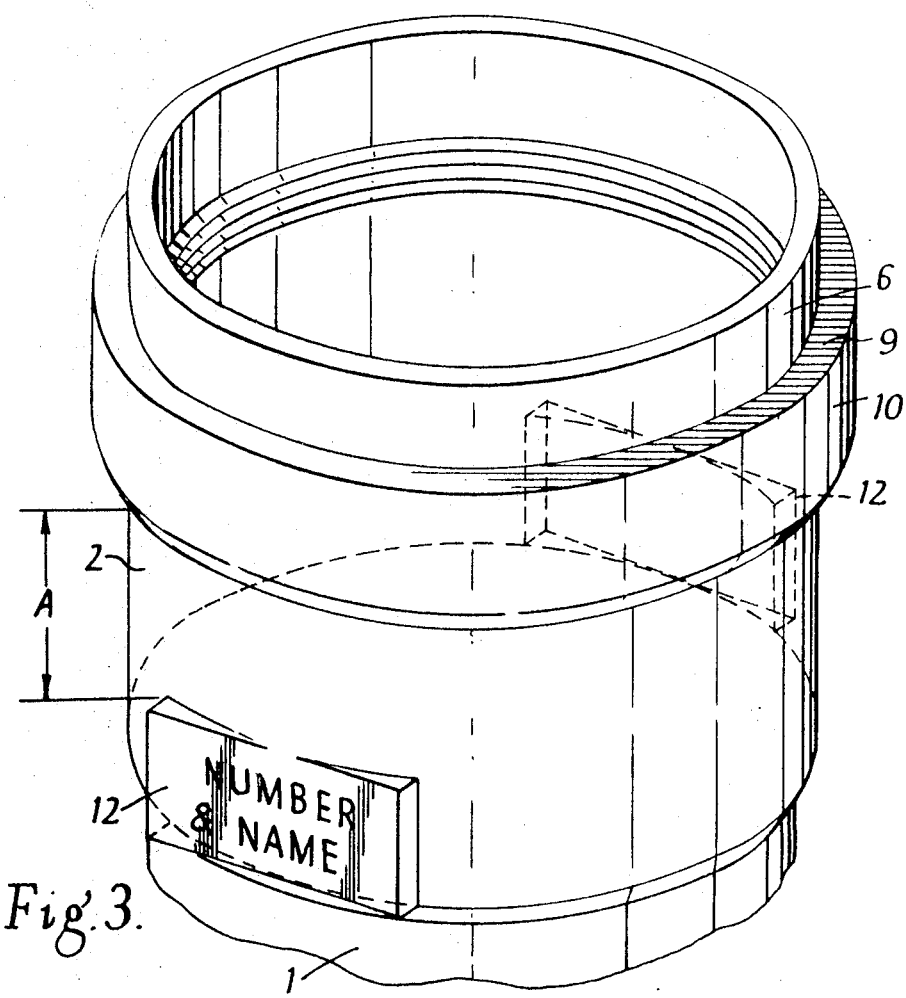
FIG. 3 is a perspective view of the embodiment of FIG. 2 but not showing the clip and FIG. 4 illustrates a modified fitting including a snap on locking ring.

It may be necessary in some cases to attach the pipe or fitting to a wall of a building and for this purpose the socket part 2 may be moulded so as to include a number of projections 11 which are moulded integrally with it so as to leave a gap A (FIG. 3) between the projections 12 and the shoulder 8. As shown in FIG. 3 the projections are shaped to form a number of (in this case two) number and name pads which identify the maker and/or type or size of the pipe or fitting.

When the pipe or fitting is being assembled, a socket clip 12 is fitted around the socket part of each pipe or fitting where it is needed and the clips are secured to a wall or other support for the pipe.

Figure 2:
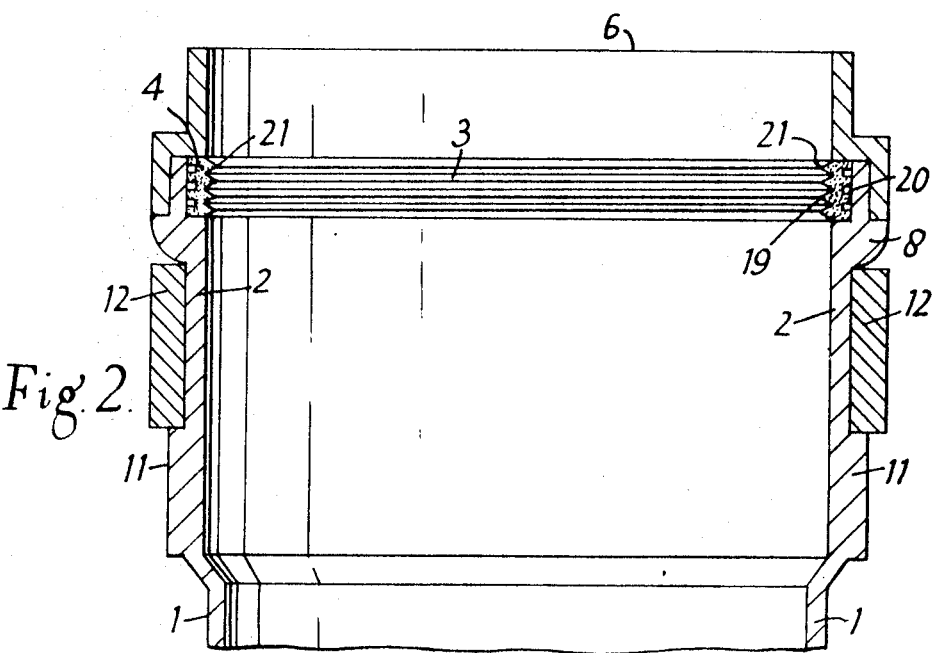
FIG. 2 is a modification of the embodiment of FIG. 1 showing how the fitting can be adapted to receive a clip so that the fitting can be attached to the wall of a building.

It should be noted that the pads 11 are moulded proud on each side of the socket 2 so that they provide the required projections which engage the clip 12 without necessarily increasing the maximum width across the socket. Thus the section of FIG. 2, is taken in a plane to show the minimum diameter of the projections which in this case is the same as the outside diameter of the projecting shoulder 8. The centers of the pads 11 are flush with or can be below the surface of the part of the socket which is surrounded by the clip 12.

This construction of the pads 12 to form the projections provides useful advantages in the manufacture of the pipes, while the combination of these projections with the projecting shoulder 8 enables each socket to be held against axial movement, thereby ensuring that thermal expansion or contraction in a long length of pipe is distributed amongst the connections along it.

A further feature of the invention is that it provides a method, which is now economic and which is dimensionally correct, whereby the housing for the sealing ring 4 can be formed as a part of the manufacture of the pipe or fitting itself, the sealing ring housing being formed by providing a suitable step in the punch of the moulding tool used.

Figure 4:
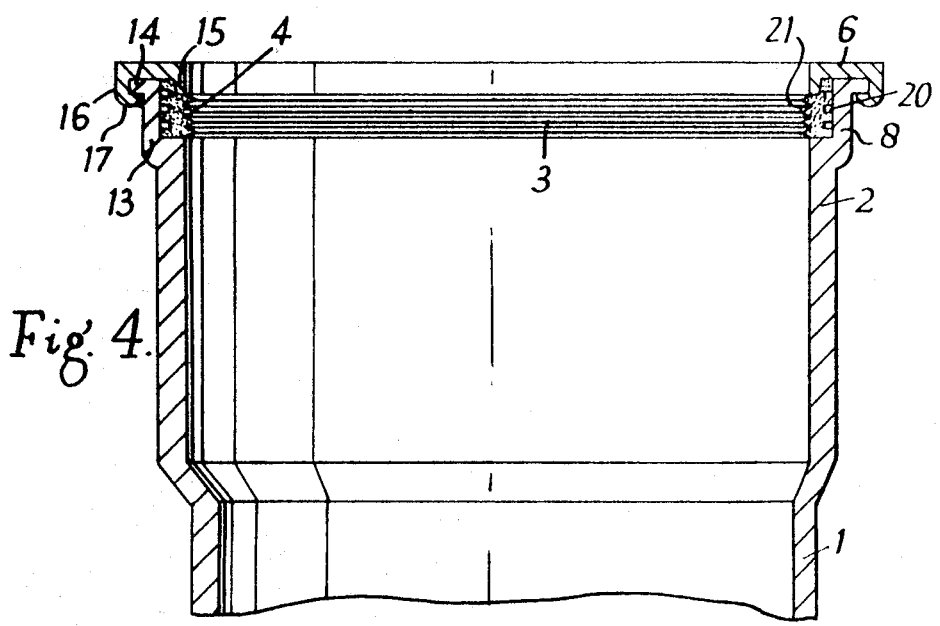

As an alternative to using solvent or fusion welding, or an adhesive or bonding agent, the locking ring 6 and the end of the socket 2 could be so shaped as to form a snap or clipping engagement with each other as shown in FIG. 4.

The embodiment shown in FIG. 4 comprises a tubular socket section 2 whose internal and external diameters are increased to form an internal annular recess 3 into which is fitted a resilient sealing ring 4 as already described. The external diameter of the pipe or fitting in this region is also correspondingly increased to form a projecting ring 13 having a shoulder 8 and which is provided with a radially extending flange 14 around its upper most edge.

The snap on locking ring 6 has a downwardly depending lip 15, around its internal periphery and a similar lip 16 around its external periphery, said latter lip being provided with a second bevelled lip 17 which snaps under the flange 14 when the locking ring is pushed down onto the pipe or fitting. The internal diameter of the ring is preferably the same as that of the socket part of the pipe or fitting 2 so that when assembled the internal surface is generally cylindrical except for the recess formed between the two parts in which the sealing pad is held by the locking ring.

The locking ring may be provided with a plurality of lips 16 spaced around the periphery of the ring, each of which lips can snap under one of a number of corresponding flanges formed around the periphery of the outer edge of the recess.

The fitting can be modified in the same way as described with reference to FIGS. 2 and 3 so that it can accept a clip for attaching it to the wall of a building, the clip being positioned between the projecting pads 11 and the annular shoulder 8.

I claim:

1. A pipe member for receiving the spigot end of a pipe in sliding engagement comprising a body portion and a terminal socket section formed integrally with said body portion, said socket section having an annular recess formed in the free end thereof, said recess being open ended and having an end face against which one end of a resilient sealing ring can seat, a resilient sealing ring retained in said recess, a locking ring retaining the sealing ring in said recess, said locking ring having a surface which axially compresses said sealing ring to force said one end to seat against said end face and an axial skirt around the internal periphery of said locking ring which compresses said sealing ring in a radial direction and retains it in said annular recess, and means cooperating with said socket section to maintain the ring and pipe member in engagement.

2. A pipe member according to claim 1, wherein said means on said locking ring which cooperates with said socket section is an annular lip which snaps under an annular flange formed around the end outer edge of said recess, to hold said sealing ring in position.

3. A pipe member according to claim 2, wherein said annular lip has a bevelled edge so that said locking ring can be pushed downwardly onto said socket section until said lip snaps under said annular flange.

4. A pipe member according to claim 1, wherein the body portion has an external surface on which projections are formed, said projections being so spaced on said body portion as to allow a clip to engage around said body between said projections and said locking ring, thereby limiting longitudinal movement of said body relative to said clip.

5. A pipe member according to claim 4, wherein an annular shoulder is formed around said outer surface of said body portion adjacent said recess and said clip is engaged around said body portion between said projections and said shoulder.

6. A pipe member according to claim 1, wherein said sealing ring has an internal surface around which surface a number of circumferential ribs are formed.

7. A pipe member according to claim 6, wherein said sealing ring has an external surface which contracts said recess and grooves corresponding to said ribs are formed around said external surface.

8. A pipe member according to claim 1, wherein said sealing ring has an outer surface in which a number of grooves are formed.